United States Patent
Racca

(10) Patent No.: US 10,184,390 B2
(45) Date of Patent: Jan. 22, 2019

(54) METHOD OF OPERATING A TURBOCHARGED AUTOMOTIVE SYSTEM

(71) Applicant: GM GLOBAL TECHNOLOGY OPERATIONS LLC, Detroit, MI (US)

(72) Inventor: Alberto Racca, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 247 days.

(21) Appl. No.: 15/234,133

(22) Filed: Aug. 11, 2016

(65) Prior Publication Data
US 2017/0044971 A1    Feb. 16, 2017

(30) Foreign Application Priority Data
Aug. 11, 2015 (GB) .................................. 1514122.9

(51) Int. Cl.
*F02B 33/44*    (2006.01)
*F02B 37/14*    (2006.01)
(Continued)

(52) U.S. Cl.
CPC .............. *F02B 37/14* (2013.01); *F02B 37/04* (2013.01); *F02B 39/10* (2013.01);
(Continued)

(58) Field of Classification Search
CPC ........ F02B 37/14; F02B 37/04; F02B 37/013; F02B 2037/125; F02D 41/0007; F02D 41/10; F02D 2250/18; Y02T 10/144
(Continued)

(56) References Cited

U.S. PATENT DOCUMENTS 6,020,652 A    2/2000 Daudel et al.
6,050,093 A    4/2000 Daudel et al.
(Continued)

FOREIGN PATENT DOCUMENTS

JP    2007071116 A    3/2007
JP    2007077854 A    3/2007

OTHER PUBLICATIONS

Great Britain Patent Office, Great Britain Search Report for Great Britain Application No. 1514122.9, dated Feb. 18, 2016.

*Primary Examiner* — Thai Ba Trieu
(74) *Attorney, Agent, or Firm* — Lorenz & Kopf, LLP

(57) ABSTRACT

A method of operating an automotive system having an internal combustion engine equipped with an electric compressor and a turbocharger having a turbocharger compressor is disclosed. A surge threshold line and a pre-surge threshold line in a turbocharger compressor map are defined as a function of a turbocharger compressor pressure ratio and mass flow rate. The pre-surge threshold line is defined in terms of greater mass flow values for each corresponding pressure ratio value of the surge threshold line. The position of a turbocharger compressor working point in the turbocharger compressor map is monitored as a function of the turbocharger compressor pressure ratio and mass flow rate. When an increased torque request is detected, the electric compressor is activated to assist the turbocharger compressor in delivering the requested torque when the turbocharger compressor working point crosses the pre-surge threshold line in a direction towards the surge threshold line.

11 Claims, 7 Drawing Sheets

(51) Int. Cl.
*F02B 37/04* (2006.01)
*F02B 39/10* (2006.01)
*F02D 41/00* (2006.01)
F02B 37/12 (2006.01)
F02D 41/10 (2006.01)

(52) U.S. Cl.
CPC .... *F02D 41/0007* (2013.01); *F02B 2037/125* (2013.01); *F02D 41/10* (2013.01); *F02D 2200/602* (2013.01); *F02D 2250/18* (2013.01); *Y02T 10/144* (2013.01)

(58) Field of Classification Search
USPC .................. 60/612, 607–608, 611, 605.1
See application file for complete search history.

(56) References Cited

U.S. PATENT DOCUMENTS

| | | | |
|---|---|---|---|
| 6,871,498 B1 | 3/2005 | Allen et al. | |
| 7,137,253 B2* | 11/2006 | Furman | F02B 39/10 60/608 |
| 7,793,500 B2* | 9/2010 | Igarashi | F02D 41/0007 60/611 |
| 7,992,389 B2* | 8/2011 | Furman | F02B 39/10 60/608 |
| 2008/0053091 A1 | 3/2008 | Barthelet | |
| 2015/0135706 A1* | 5/2015 | Takao | F02D 41/12 60/602 |
| 2016/0061102 A1* | 3/2016 | Sugiyama | F02B 39/10 60/611 |
| 2016/0061104 A1* | 3/2016 | Hirayama | F02B 39/10 60/602 |
| 2016/0363043 A1* | 12/2016 | Hirayama | F02D 41/10 |
| 2017/0030259 A1* | 2/2017 | Tabata | F02D 41/10 |

\* cited by examiner

METHOD OF OPERATING A TURBOCHARGED AUTOMOTIVE SYSTEM

CROSS-REFERENCE TO RELATED APPLICATION

This application claims priority to British Patent Application No. GB1514122.9, filed Aug. 11, 2015, which is incorporated herein by reference in its entirety.

TECHNICAL FIELD

The technical field relates to a method of operating an automotive system including an internal combustion engine equipped with a turbocharger and with an electric compressor.

BACKGROUND

Internal combustion engines may be provided with a forced air system such as a turbocharger in order to increase an engine efficiency and power by forcing extra air into the combustion chamber of the cylinders. The turbocharger includes a compressor rotationally coupled to a turbine. Variable geometry turbines (VGT) are generally used, namely turbines that are equipped with a VGT actuator arranged to move a rack of vanes in different positions to alter the flow of the exhaust gases through the turbine. The turbine tends to accelerate as the vanes are closing and to decelerate as the vanes are opening.

In some automotive systems, the compressor may be assisted by an electric compressor. The electric compressor power along the maneuvers is modulated comparing a target boost memorized in a map stored in a data carrier associated with an Electronic Control Unit (ECU) of the internal combustion engine with a manifold pressure value measured by a manifold pressure and temperature sensor (TMAP) provided in the intake manifold of the engine. When a boost target is reached, the electric machine is switched off or deactivated and the boost target is maintained in steady state by the turbocharger compressor alone.

A common limitation in the achievement of high low-end torque values in turbocharged engines is represented by compressor surge phenomena. As is known in the art, compressor surge may give rise to instability phenomena that may cause disruption of the flow through the compressor. In order to prevent the occurrence of compressor surge phenomena and to achieve higher boost levels, the use of the electric compressor may be useful. However, each activation of the electric compressor has a negative impact on electric power consumption and must be planned accordingly.

SUMMARY

In accordance with the present disclosure a low-end torque increase is achieved for working points affected by limitations that may be induced by incipient surge phenomena occurrence while, at the same time, limit the impact on electric power consumption of the activation of the electric compressor. An embodiment of the disclosure provides a method of operating an automotive system, the automotive system including an internal combustion engine equipped with a turbocharger and with an electric compressor. A surge threshold line and a pre-surge threshold line in a turbocharger compressor map are defined as a function of a turbocharger compressor pressure ratio and of a mass flow rate. The pre-surge threshold line is defined in terms of greater mass flow values for each corresponding pressure ratio value of the surge threshold line. The position of a turbocharger compressor working point in the turbocharger compressor map is monitored as a function of the turbocharger compressor pressure ratio and of the mass flow rate. An increased torque request is detected and the electric compressor is activated to assist the turbocharger compressor in delivering the requested torque when the turbocharger compressor working point crosses the pre-surge threshold line in a direction towards the surge threshold line.

An advantage of this embodiment is that, following the above logic, the electric compressor is activated only when the working point of the turbocharger compressor is approaching, but not yet reaching, the surge limitation line. The activation of the electric compressor helps to achieve higher boost levels because, after such activation, the working point in the turbocharger compressor map is allowed to move towards higher pressure ratios. This is possible until sufficient electric power is available in the battery.

According to another embodiment, a deactivation threshold line in a turbocharger compressor map is defined as a function of a turbocharger compressor pressure ratio and of a mass flow rate. The deactivation threshold line is defined in terms of greater mass flow values for each corresponding pressure ratio value of the pre-surge threshold line. The electric compressor is deactivated when the turbocharger compressor working point crosses the deactivation threshold line in a direction away from the pre-surge threshold line.

An advantage of this embodiment is that of a further refinement of the above method, reducing the number of activations and deactivations of the electric compressor that would occur if only the pre-surge line was defined. Furthermore, the strategy of the above embodiment helps to minimize the electric compressor activation, in order to enable a longer lasting and stable achievement of higher low-end torque values, leading to a wiser consumption of the stored electrical energy and obtaining Brake Specific Fuel Consumption (BSFC) improvements.

According to another embodiment, a pressure value at the outlet of the turbocharger compressor is measured. A pressure value at the inlet of the turbocharger compressor is calculated. A turbocharger compressor pressure ratio between the pressure value at the outlet of the turbocharger compressor and the pressure value at the inlet of the turbocharger compressor is calculated. An advantage of this embodiment is that it determines a first coordinate of the turbocharger compressor working point, as represented on the turbocharger compressor map, during the operations of the automotive system.

According to another embodiment, the pressure value at the inlet of the turbocharger compressor is calculated as a function of an ambient pressure value. An advantage of this embodiment is that it determines the pressure value at the inlet of the turbocharger compressor, using a sensor generally provided on board of current automotive systems, therefore with no additional equipment costs.

According to another embodiment, the mass flow rate of the turbocharger compressor is calculated as a function of an intake duct mass flow rate, a turbocharger compressor inlet pressure and of a turbocharger compressor inlet temperature. An advantage of this embodiment is that determines a second coordinate of the turbocharger compressor working point on the turbocharger compressor map during the operations of the automotive system.

According to another embodiment, a rotational speed of the turbocharger is measured. Rhe mass flow rate of the turbocharger compressor is calculated. The position of the turbocharger compressor working point on the turbocharger compressor map is determined as a function of the measured rotational speed of the turbocharger and of the calculated mass flow rate of the turbocharger compressor. An advantage of this embodiment is that it allows an alternative procedure for determining the coordinates of the turbocharger compressor working point on the turbocharger compressor map during the operations of the automotive system.

According to still another embodiment, the pressure value at the inlet of the turbocharger compressor is calculated as a function of an electric compressor pressure ratio. An advantage of this embodiment is to allow a straightforward way to determine the pressure value at the inlet turbocharger compressor, in case that the layout of the automotive system provides for an electric compressor located upstream of the turbocharger compressor.

According to a further embodiment, the electric compressor pressure ratio is calculated by determining the electric compressor working point on an electric compressor map as a function of the measured rotational speed of the electric compressor and of a mass flow rate of the electric compressor. An advantage of this embodiment is that it calculates the electric compressor pressure ratio as a function of data readily available to the ECU.

According to another embodiment, the pressure value at the outlet of the turbocharger compressor is calculated as a function of an intake manifold measured pressure. An advantage of this embodiment is that it allows determine the pressure value at the inlet of the turbocharger compressor using a sensor generally provided on board of current automotive systems.

According to another embodiment, the turbocharger compressor inlet temperature is calculated as a function of a measured ambient temperature.

According to another aspect of the present disclosure, an apparatus is provided for operating an automotive system including an internal combustion engine equipped with an electric compressor and a turbocharger including a turbocharger compressor. The apparatus further includes an electronic control unit or other means configured to: define a surge threshold line and a pre-surge threshold line in a turbocharger compressor map as a function of a turbocharger compressor pressure ratio and of a mass flow rate, the pre-surge threshold line being defined in terms of greater mass flow values for each corresponding pressure ratio value of the surge threshold line; monitor the position of a turbocharger compressor working point in the turbocharger compressor map as a function of the turbocharger compressor pressure ratio and of the mass flow rate; detect an increased torque request; and activate the electric compressor to assist the turbocharger compressor in delivering the requested torque when the turbocharger compressor working point crosses the pre-surge threshold line in a direction towards the surge threshold line.

An advantage of this aspect is similar to one provided by the method, namely the electric compressor is activated only when the working point of the turbocharger compressor is approaching, but not yet reaching, the surge limitation line. The activation of the electric compressor helps to achieve higher boost levels because, after such activation, the working point in the turbocharger compressor map is allowed to move towards higher pressure ratios. This is possible until sufficient electric power is available in the battery.

According to another aspect of the present disclosure, the apparatus includes a pressure sensor positioned at an outlet of the turbocharger compressor, and the electronic control unit or other means is configured to monitor the position of a turbocharger compressor working point in the turbocharger compressor map. An advantage of this aspect is that it allows a straightforward way to obtain the pressure value downstream of the turbocharger compressor.

According to still another aspect of the present disclosure, the electronic control unit or other means is configured to monitor the position of a turbocharger compressor working point in the turbocharger compressor map include a turbocharger rotational speed sensor. An advantage of this aspect is that it allows a straightforward way to obtain the rotational speed value of the turbocharger.

According to another aspect, the electronic control unit or other means is configured to: define a deactivation threshold line in a turbocharger compressor map as a function of a turbocharger compressor pressure ratio and of a mass flow rate; and deactivate the electric compressor when the turbocharger compressor working point crosses the deactivation threshold line in a direction away from the pre-surge threshold line. The deactivation threshold line is defined in terms of greater mass flow values for each corresponding pressure ratio value of the pre-surge threshold line. An advantage of this aspect is that it reduces the number of activations and deactivations of the electric compressor that would occur if only the pre-surge line was defined. Furthermore, the above aspect helps to minimize the electric compressor activation, in order to enable a longer lasting and stable achievement of higher low-end torque values, leading to a wiser consumption of the stored electrical energy and obtaining Brake Specific Fuel Consumption (BSFC) improvements.

According to another aspect, the apparatus includes a sensor or other means configured to measure a pressure value at the outlet of the turbocharger compressor. The electronic control unit or other means is configured to calculate a pressure value at the inlet of the turbocharger compressor; and to calculate a turbocharger compressor pressure ratio between the pressure value at the outlet of the turbocharger compressor and the pressure value at the inlet of the turbocharger compressor. An advantage of this aspect is that it determines a first coordinate of the turbocharger compressor working point on the turbocharger compressor map during the operations of the automotive system.

According to another aspect, the electronic control unit or other means is configured to calculate the pressure value at the inlet of the turbocharger compressor as a function of an ambient pressure value. An advantage of this aspect is that it determines the pressure value at the inlet of the turbocharger compressor using a sensor generally provided on board of current automotive systems.

According to another aspect, the electronic control unit or other means is configured to calculate the mass flow rate of the turbocharger compressor as a function of an intake duct mass flow rate, a turbocharger compressor inlet pressure and of a turbocharger compressor inlet temperature. An advantage of this aspect is that determines a second of the coordinates of the turbocharger compressor working point on the turbocharger compressor map during the operations of the automotive system.

According to another aspect, the apparatus includes a sensor or other means configured to measure a rotational speed of the turbocharger. The electronic control unit or other means is configured to calculate the mass flow rate of the turbocharger compressor, and to determine the position of the turbocharger compressor working point on the turbocharger compressor map as a function of the measured rotational speed of the turbocharger and of the calculated mass flow rate of the turbocharger compressor. An advantage of this aspect is that it determines the coordinates of the turbocharger compressor working point on the turbocharger compressor map during the operations of the automotive system.

According to still another aspect, the electronic control unit or other means is configured to calculate the pressure value at the inlet of the turbocharger compressor as a function of an electric compressor pressure ratio. An advantage of this aspect is to allow a straightforward way to determine the pressure value at the inlet turbocharger compressor, in case that the layout of the automotive system, the electric compressor is upstream of the turbocharger compressor.

According to a further aspect, the electronic control unit or other means is configured to calculate the electric compressor pressure ratio by determining the electric compressor working point on an electric compressor map as a function of the measured rotational speed of the electric compressor and of a mass flow rate of the electric compressor. An advantage of this aspect is that it calculates the electric compressor pressure ratio as a function of data readily available to the ECU.

According to another aspect, the electronic control unit or other means is configured to calculate the pressure value at the outlet of the turbocharger compressor as a function of an intake manifold measured pressure. An advantage of this aspect is that it determines the pressure value at the inlet of the turbocharger compressor using a sensor generally provided on board of current automotive systems.

According to another aspect, the electronic control unit or other means is configured to calculate the turbocharger compressor inlet temperature as a function of a measured ambient temperature.

BRIEF DESCRIPTION OF THE DRAWINGS

The various embodiments will now be described, by way of example, with reference to the accompanying drawings, wherein like numerals denote like elements, and in which.

DETAILED DESCRIPTION

Exemplary embodiments will now be described with reference to the enclosed drawings without intent to limit application and uses.

Figure 1:
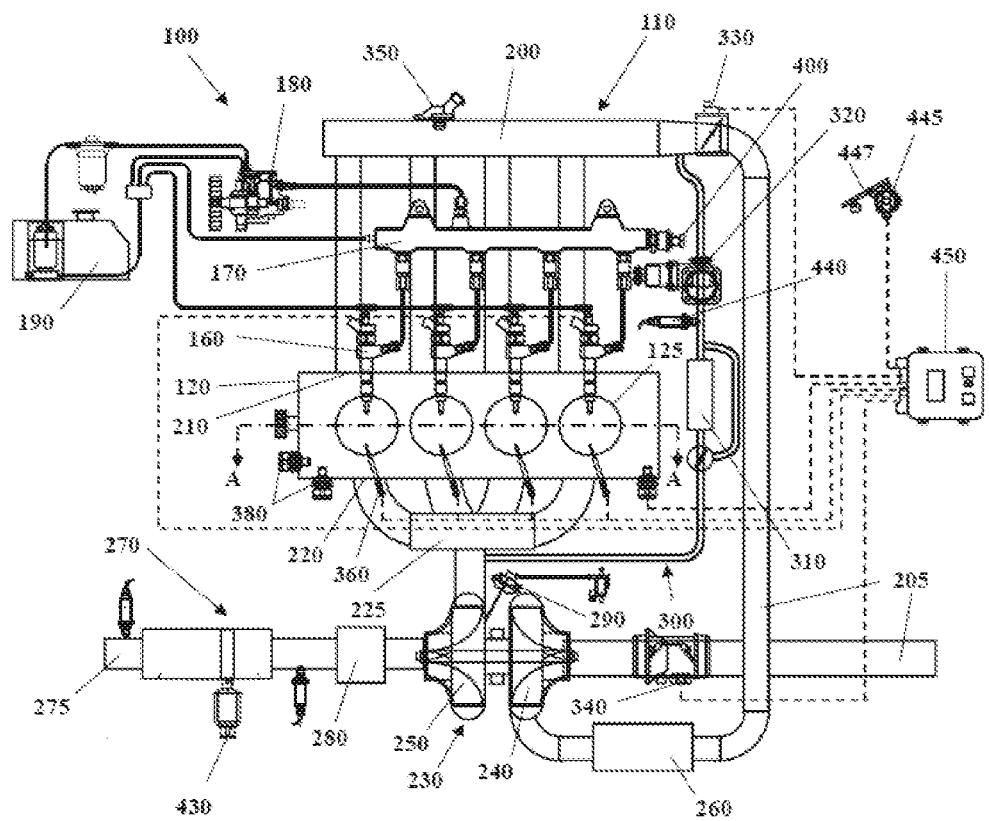
FIG. 1 shows an automotive system.
Figure 2:
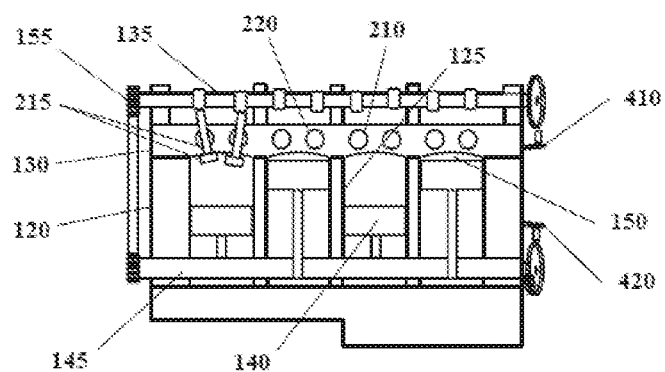
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

In the combustion chamber 150 is located a glow plug 360 which is a heating element which is electrically activated for cold starting of the engine and also for improving the combustion performance within the combustion chamber. The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200.

In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move a rack of vanes 295 in different positions, namely from a fully closed position to a fully open position, to alter the flow of the exhaust gases through the turbine 250. In other embodiments, the turbocharger 230 may be fixed geometry and/or include a waste gate.

Figure 9:
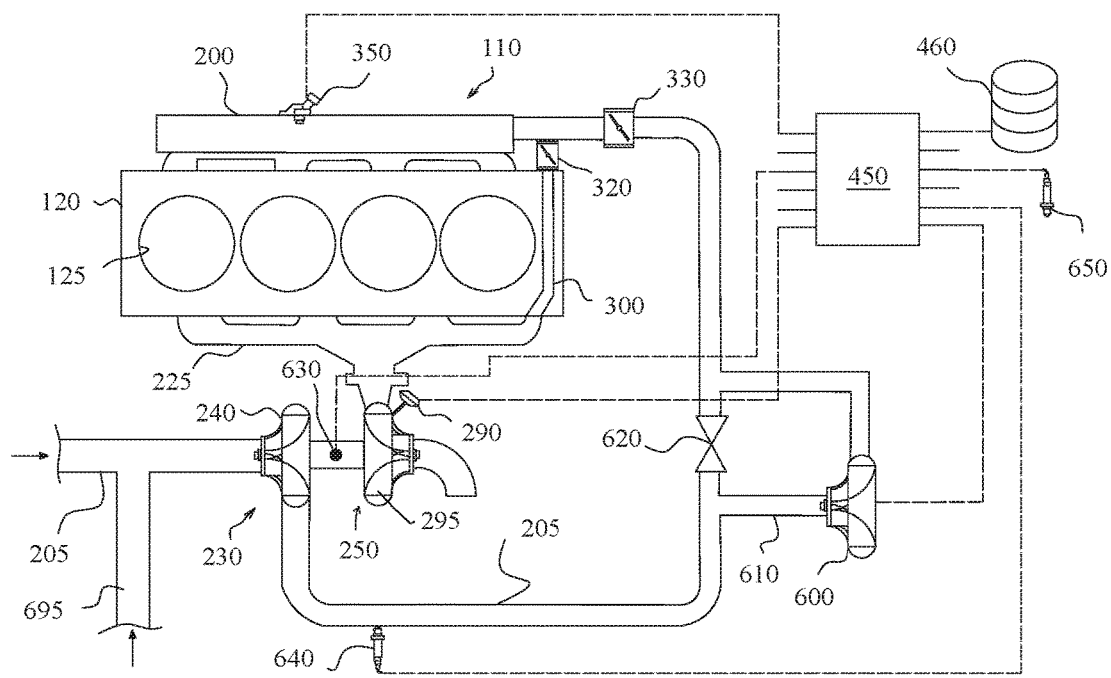
FIG. 9 is a schematic representation of a portion of the automotive system of FIG. 1.
Figure 10:
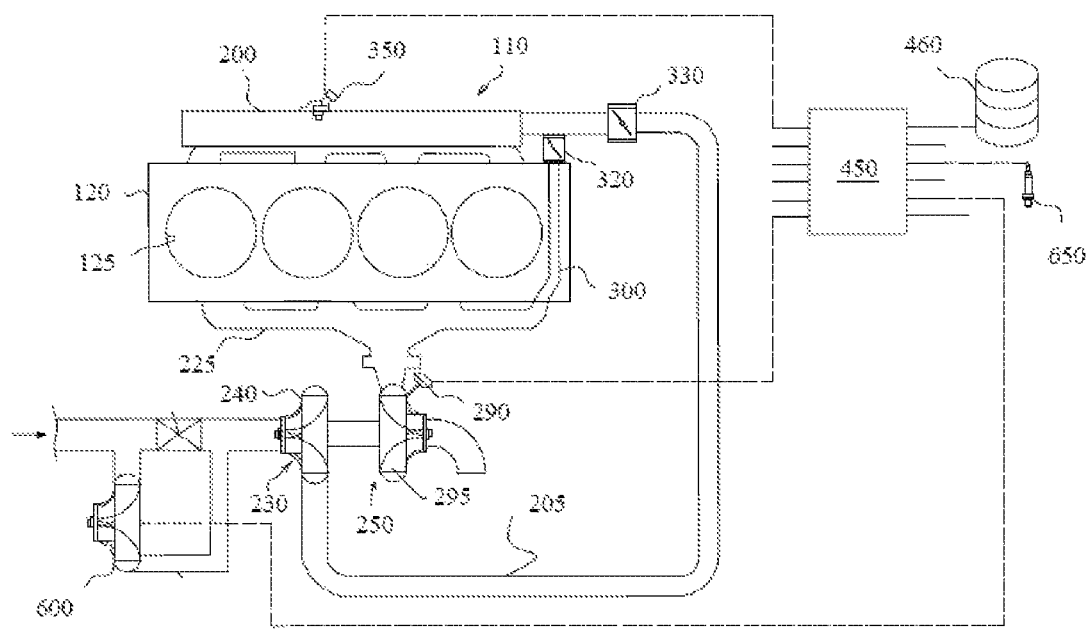
FIG. 10 is a schematic representation of an alternative layout of a portion of the automotive system of FIG. 1.

According to the various embodiments of the automotive systems, the turbocharger compressor 240 is complemented by an electric compressor 600. FIGS. 9 and 10, which will be explained in more detail hereinafter, represents schematically alternative layouts of a portion of the automotive system of FIG. 1, equipped with an electric compressor 600. The exhaust gases of the engine are directed into an exhaust system 270. The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon absorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and with a memory system, or data carrier 460, and an interface bus. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor that may be integral within the glow plugs 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal 447 position sensor 445. Furthermore, the ECU 450 may generate output signals to various control devices that are arranged to control the operation of the ICE 110, including, but not limited to, the fuel injectors 160, the throttle body 330, the EGR Valve 320, a Variable Geometry Turbine (VGT) actuator 290, and the cam phaser 155. Note, dashed lines are used to indicate communication between the ECU 450 and the various sensors and devices, but some are omitted for clarity.

Figure 3:
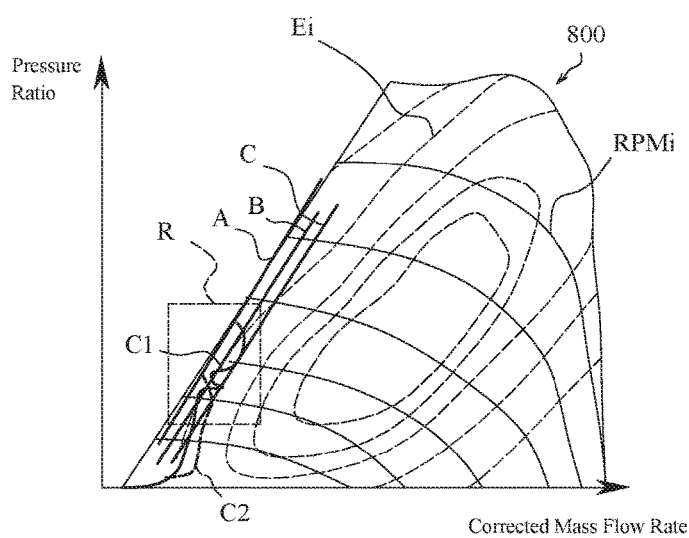
FIG. 3 is a graph representing a compressor map and FIG. 4 is an enlarged portion of the graph of FIG. 3.

FIG. 3 is a graph representing a compressor map 800. As is known in the art, a compressor map 800 is defined experimentally for each compressor in a plane defined by a corrected or reduced mass flow through the compressor axis and a pressure ratio axis. Since the concepts of the various embodiments of the present disclosure do not change if corrected mass flow is used instead of the reduced mass flow, in the following description, whenever not differently indicated, only the expression mass flow will be used. In the compressor map of FIG. 3, a series of curves generically indicated with RPMi indicate different values of the speed of rotation of the compressor 240, while dotted curves Ei indicate are iso-efficiency curves referred to the compressor 240, the efficiency values generally increasing towards the centre of the map.

Figure 4:
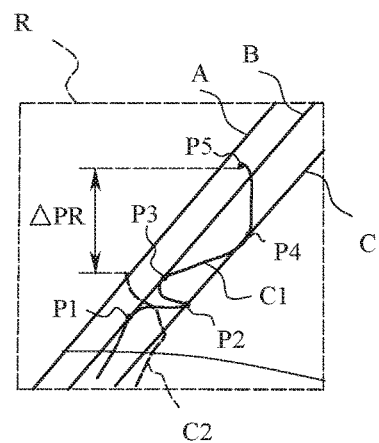

Line A indicates the surge line, namely the line that separates regions of stable flow within the compressor from a region of unstable flow represented above and at the left of surge line A. The compressor surge line A therefore indicates the limit of the maximum boost levels achievable in each load step. According to an embodiment of the present disclosure, two further threshold lines are defined, namely a pre-surge line B and a compressor deactivation line C, both lines B and C will be better explained hereinafter. Suffice it now to say that the introduction of the two threshold pre-surge and deactivation lines B and C (FIGS. 3-4) allow to properly modulate the electric compressor 600 activation time and the related electric power consumption and that the pre-surge threshold line B is defined in terms of greater corrected mass flow values for each corresponding pressure ratio value of the surge threshold line A and the deactivation threshold line C is defined in terms of greater mass flow values for each corresponding pressure ratio value of the pre-surge threshold line B. Finally, two performance curves C1 and C2 (in dotted lines) are represented on the compressor map, where C1 is a performance curve obtained according an embodiment of the present disclosure and curve C2 is a baseline curve resulting from operating the compressor 240 according to the prior art, both curves C1 and C2 being defined by the variation of the turbocharger working point P on the compressor map over a load step manoeuvre. FIG. 4 is an enlarged portion (rectangle R) of the graph of FIG. 3 in which the relevant portion is better visible.

Figure 5:
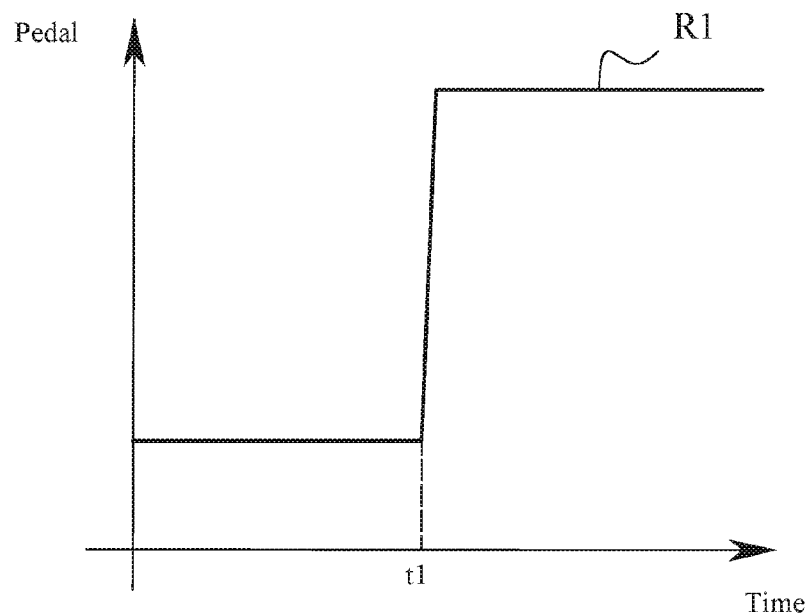
FIG. 5 represents a pedal position over time and FIG. 6 a power profile to be delivered to an electric compressor as a function of the pedal position of FIG. 5.
Figure 6:
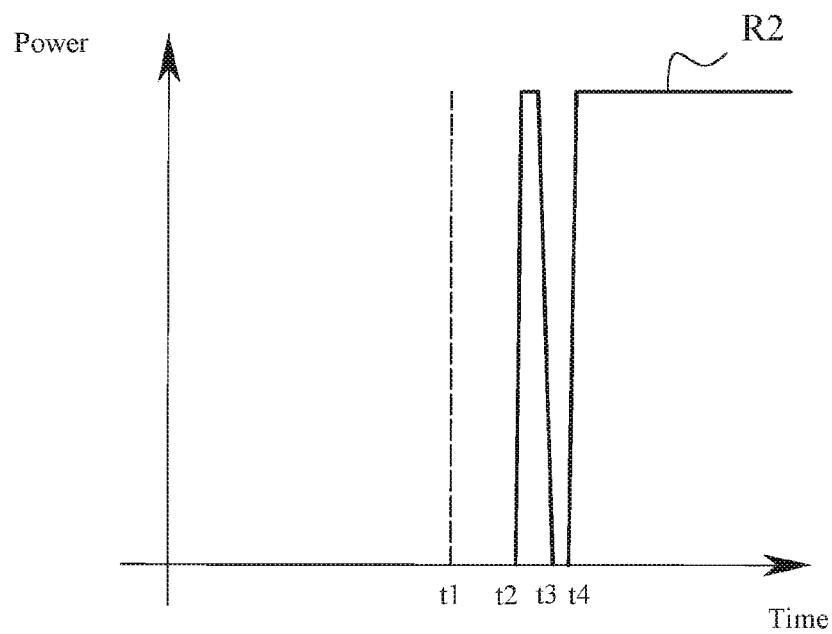

In particular, in FIG. 5 a load step event is represented in terms of a pedal position curve R1 over time and FIG. 6 a power profile to be delivered to an electric compressor as a function of the pedal position of FIG. 5. FIG. 5 shows a load step starting at an instant t1 and FIG. 6 the mechanical power R2 released by the motor of the electric compressor 600 to the electric compressor shaft according to an embodiment of the method. The graph of FIG. 6 shown the time of activation t2 of the electric compressor 600, which is delayed with respect to the actual pedal request at time t1 and the intermediate deactivation of the electric compressor (at time t3) and the subsequent re-activation of the electric compressor at time t4.

Figure 7:
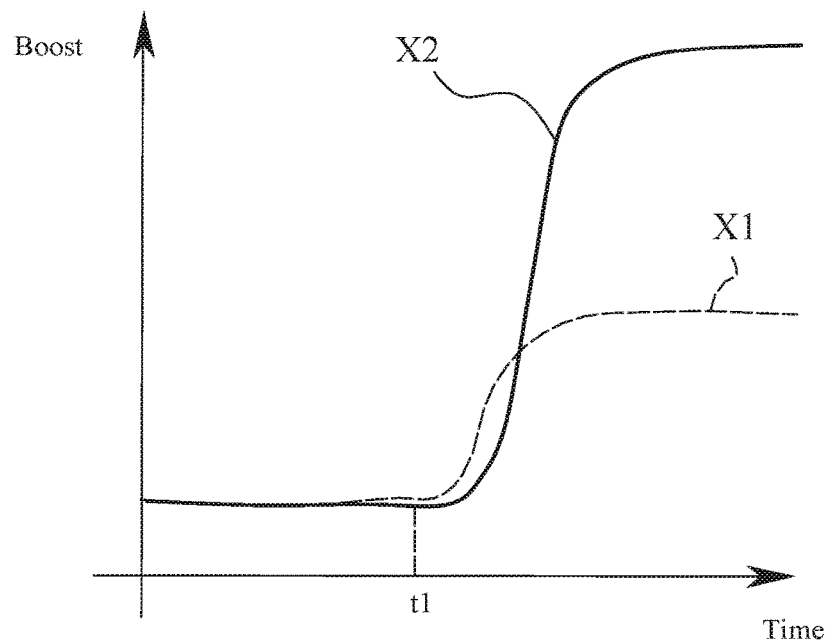
FIGS. 7 and 8 represent respectively the boost and the brake torque delivered by the electric compressor.
Figure 8:
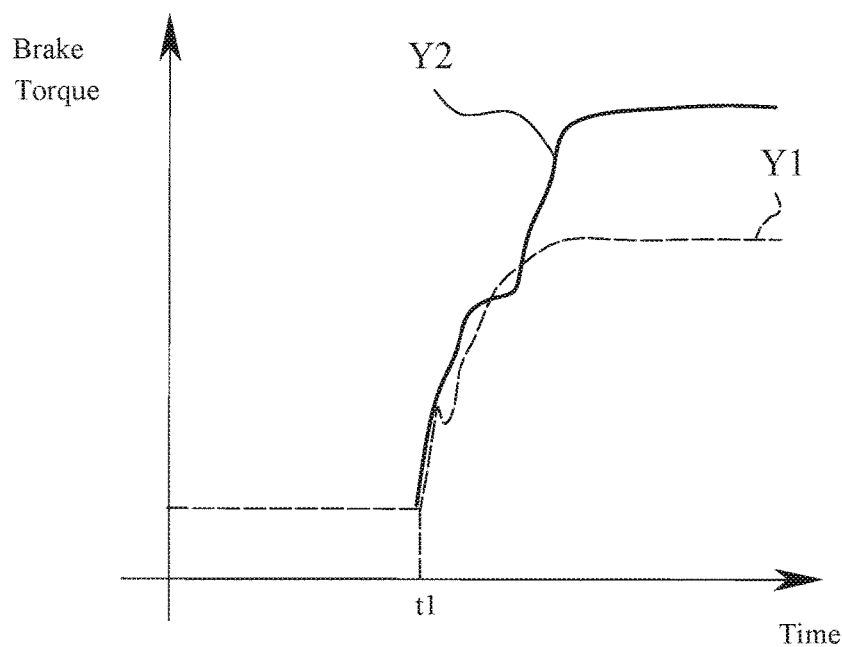

In FIG. 7 it is represented the evolution of the boost as a function of the control strategy according to an embodiment of the present disclosure (curve X2) as compared to a baseline boost (curve X1) according to the prior art and in FIG. 8 it is represented the evolution of the brake torque as a function of the control strategy according to an embodiment of the present disclosure (curve Y2), as compared to a baseline brake torque (curve Y1) according to the prior art in order to the significant pressure ratio experienced. This dynamics results from the control strategy outlined as follows.

At the beginning of the load step maneuver, at time t1, the pedal request reaches quickly a high value, for example 100%, and a fast closure of the VGT actuator 290 is commanded by the ECU 450 in order to increase the boost, up to a target value mapped in the ECU 450. The boost build-up is associated to a torque increase because of greater fuel injection quantity, a quantity that is only limited by a smoke map memorized in the data carrier 460 associated with the ECU 450. The maximum boost for a standard application is frequently determined in the low-end area by the surge limit, namely line A in FIGS. 3-4.

As soon as the trace of working points in the turbocharger compressor 240 map approaches the surge line A and crosses the pre-surge threshold line B in a direction towards the surge threshold line A, a control strategy according to an embodiment of the present disclosure, activates the electric compressor 600 (point P1). The mass flow rate through the intake line suddenly increases and the working point of the turbocharger compressor 240 moves towards an inner position in the turbocharger compressor 240 map (point P2 in FIG. 4). Therefore the VGT can continue to remain closed in order to sustain a further boost increase, avoiding the occurrence of surge phenomena.

With reference to FIGS. 3 and 4, the electric compressor 600 is activated any time the working point exceeds the pre-surge line B, in order to provide a conservative margin respect to any surge occurrence. More specifically, the electric compressor 600 is activated any time the turbocharger compressor working point P crosses the pre-surge threshold line B in a direction towards the surge threshold line A. An immediate increase of mass flow rate at an almost constant pressure ratio is then experienced inside the turbocharger compressor 240. After that, the electric compressor 600 is deactivated (point P2) and therefore a gradual decrease of mass flow rate occurs, while the pressure ratio continues to increase because of the closed rack position. In particular, the electric compressor 600 is deactivated, if the turbocharger compressor working point P crosses the deactivation threshold line C in a direction away from the pre-surge threshold line B.

As soon as the working point P of the turbocharger compressor 240 approaches again the pre-surge line B, the electric compressor 600 is activated again (point P3) and this is happens until the new target of boost is reached. The increase in pressure ratio (PR) with respect to the baseline value is evident in FIGS. 3 and 4 and it is associated to a higher boost and torque release, as expressed in FIGS. 7 and 8.

The additional deactivation line C in FIGS. 3 and 4 implements a further refinement of the control strategy according to an embodiment of the present disclosure. If only the pre-surge line B is used, the deactivation of the electric compressor 600 would happen as soon as the working point would pass through such pre-surge line, moving towards the right hand side of the turbocharger compressor map. As previously mentioned, the activation of the electric compressor 600 induces a significant instantaneous increase of mass flow rate: therefore, the control would immediately deactivate the electric compressor 600. Then the natural dynamics of the engine 110 quickly drives again the mass flow rate to lower values, and the working point would cross again the pre-surge line B in a direction towards the surge threshold line A and a new activation of the electric compressor 600 takes place. Because of the quick dynamics of the system, the number of activations along the load step would be significant, imposing a significant effort to the control.

The introduction of the deactivation line C is aimed at reducing the number of interventions along the maneuver. Once the electric compressor 600 is switched ON when the compressor working point approaches the surge line A crossing the pre-surge line B, the electric compressor 600 delivers extra boost until the working point P crosses the deactivation line C. Then the electric compressor 600 is switched OFF and the mass flow rate through the turbocharger compressor 240 starts decreasing again while moving to higher pressure ratios. The interval of time required to reach a second activation of the electric compressor 600, namely when the working point P crosses again the pre-surge line B, is longer than in the previous case because of the extra margin gained by the new position inside the map 800, which amounts to a longer travel of the working point P inside the map 800 before reaching again the pre-surge line B. A new cycle may begin until the working point P crosses again the deactivation line C (point P4) and the electric compressor is once more deactivated.

As reported in FIG. 6, the total number of activations may be corrected to only two activations in this particular example, while a significant pressure ratio gain ΔPR is experienced and at the same time a lower energy consumption is obtained. In fact, at the conclusion of such maneuver, the turbocharger compressor 240 working point P may be located in a point P5 at a high pressure ratio and inside the range of activation of the electric compressor, whose support is continuously required in order to guarantee that the turbocharger compressor 240 does not diverge towards surge conditions.

As the electrical power consumption has been actively modulated along the whole maneuver, if a determined amount of electrical power is stored at the beginning in the system, the electric compressor 600 permanence in the high pressure ratio point will be longer than with the standard case of a continuous activation since the start of the maneuver. Once the electrical power is no more available, if the load is still required, a transition to higher engine speeds will be demanded. With the control strategy according to the various embodiments of the present disclosure, this transition would occur later than with the electric compressor 600 activation according to the prior art, with a greater benefit in $CO_2$ emission reduction.

In order to implement correctly the control strategy according to the various embodiments of the present disclosure, the working point P on the turbocharger compressor 240 map has to be continuously monitored by means of the estimation of the following quantities:

$$\text{Reducedd mass flow rate} = \dot{m}\frac{\sqrt{T}}{p}$$

$$\text{Pressure ratio (total-to-total)} = \frac{p_{tot\_out}}{p_{tot\_in}}$$

Where:
$\dot{m}$ is the mass flow rate;
T is temperature at the inlet of the turbocharger compressor;
p is the pressure at the inlet of the turbocharger compressor;
$p_{tot\_out}$ is the total pressure at the outlet of the turbocharger compressor; and
$p_{tot\_in}$ is the total pressure at the inlet of the turbocharger compressor.

In order to implement the various embodiments of the present disclosure, some modifications to the automotive system with respect to the prior art may be preferably made. In FIG. 9 a portion of a modified automotive system 100 is represented. In the modified automotive system 100 of FIG. 9, an electric compressor 600 is located in a branch 610 of the air intake duct 205 and an electric compressor bypass valve 620 is provided to bypass the electric compressor 600 when needed.

According to an embodiment of the present disclosure, a pressure sensor 640 is provided at the outlet of the compressor 240 for measuring a pressure value at the outlet of the compressor 240. This additional pressure sensor 640 may be located upstream of the branch 610 leading to the electric compressor 600.

According to another embodiment of the present disclosure, a rotational speed sensor 630 for measuring a rotational speed of the turbocharger 230 may also be provided. Furthermore, the automotive system 100 is also equipped with an ambient pressure and temperature sensor 650.

In this layout, the automotive system 100 is equipped with a long route EGR conduit 695 (of which only the end portion is represented for simplicity), namely an EGR conduit 695 that connects the exhaust line downstream of the aftertreatment systems with the intake line upstream the intake manifold and is connected therein by the interposition of three-way valve or by other means. In case the automotive system 100 is equipped with a long route EGR conduit 695, the only compatible location for the electric compressor 600 is downstream of the turbocharger compressor 240, and the additional pressure sensor 640 has to be placed between the electric compressor 600 and the turbocharger compressor 240.

In this case, the pressure ratio inside the turbocharger compressor 240, which is necessary for the control strategy in order to track the turbocharger compressor working point P inside the turbocharger compressor map 800 with respect to the pre-surge and deactivation lines B and C, is calculated by means of a mass flow rate value as measured by the mass airflow sensor 340, also known as debimeter, the pressure at the compressor inlet is estimated by a known model that uses the measured ambient pressure as input. The ambient pressure and temperature may be measured by the ambient pressure and temperature sensor 650, and the compressor outlet pressure values is measured by the additional pressure sensor 640 positioned upstream of the electric compressor 600. The turbocharger compressor inlet temperature is estimated by a known model that uses the measured ambient temperature as input.

If no additional pressure sensors can be implemented in the system, a turbocharger speed sensor 630 may be included. In this case, the working point P in the turbocharger compressor map 800 may be determined by the intersection of the mass flow rate value with the relevant iso-speed line RPMi as measured by the turbocharger speed sensor 630.

In case the automotive system 100 is not equipped with a long route EGR conduit 695, the electric compressor 600 may be placed upstream of the turbocharger 250 as depicted in FIG. 10. In this case, the pressure value at the inlet of the turbocharger compressor 240 is calculated as a function of the electric compressor 600 pressure ratio. In turn, the electric compressor 600 pressure ratio is calculated by determining the electric compressor 600 working point on an electric compressor map (not represented for simplicity), as a function of the measured rotational speed of the electric compressor 600, which is available since the rotational speed of the electric motor powering the electric compressor 600 is available, and of a mass flow rate of the electric compressor 600. Differently from the embodiment above described, the pressure value at the outlet of the turbocharger compressor 240 is calculated by a known model that receives as input an intake manifold 200 pressure measured by the manifold pressure sensor 350. The turbocharger compressor 240 inlet temperature is calculated as a function of an ambient temperature measured by the ambient pressure and temperature sensor 650 and the electric compressor efficiency, when this latter is active, is retrieved from its map. This second embodiment of the method is less expensive, as no additional sensors are necessary, but it is not applicable to an automotive system 100 equipped with a long route EGR conduit 695.

Figure 11:
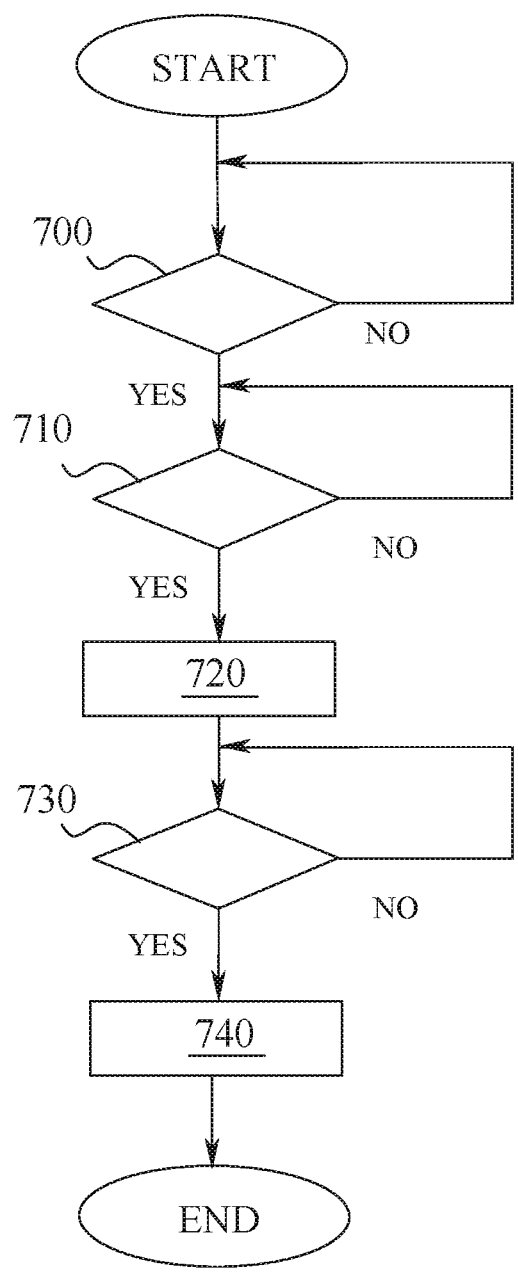
FIG. 11 is a flowchart representing an embodiment of the present disclosure.

According to an embodiment of the present disclosure, the following procedure may be followed, as also visualized in the flowchart of FIG. 11. During the operations of the automotive system 100, a turbocharger compressor 240 pressure ratio and a turbocharger compressor 240 mass flow rate are monitored, these values defining the position of a working point P on the turbocharger compressor map 800 of FIGS. 3 and 4. Furthermore, a torque request is monitored and, if an increased torque request is detected, for example by monitoring an accelerator pedal 447 position (block 700), a further check is made to verify if the working point of the turbocharger compressor 240 exceeds the pre-surge line B (block 710).

In the affirmative case, the electric compressor 600 is activated in order to assist the turbocharger compressor 240 in delivering the requested torque (block 720). An immediate increase of mass flow rate at almost constant pressure ratio is experienced inside the turbocharger compressor 240. The position of the working point P of the turbocharger compressor 240 on the turbocharger compressor map 800 is continuously monitored and if it reaches deactivation line C (block 730), the electric compressor 600 is deactivated (block 740). After the deactivation of the electric compressor 600, a gradual decrease of mass flow rate through the turbocharger compressor 240 occurs, while the pressure ratio continues to increase because of the closed rack position. As soon as the working point P of the turbocharger compressor 240 approaches again the pre-surge line B, the electric compressor 600 is activated again and this procedure may be repeated until the boost target is reached.

In the various embodiments of the present disclosure, the calculation steps needed are carried out by the ECU 450, according to computer programs stored in the data carrier 460.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, being understood that various changes may be made in the function and arrangement of elements described in an exemplary embodiment without departing from the scope as set forth in the appended claims and their legal equivalents.

What is claimed is:

1. A method of operating an automotive system having an internal combustion engine equipped with an electric compressor and a turbocharger including a turbocharger compressor, the method comprising:
    defining a surge threshold line and a pre-surge threshold line in a turbocharger compressor map as a function of a turbocharger compressor pressure ratio and a mass flow rate, wherein the pre-surge threshold line is defined in terms of greater mass flow values for each corresponding pressure ratio value of the surge threshold line;
    monitoring, using a mass airflow sensor, a pressure sensor and an electronic control unit, a position of a turbocharger compressor working point in the turbocharger compressor map as a function of the turbocharger compressor pressure ratio and the mass flow rate;
    detecting, using the electronic control unit, an increased torque request; and
    activating, using the electronic control unit, the electric compressor to assist the turbocharger compressor in delivering the requested torque when the turbocharger compressor working point crosses the pre-surge threshold line in a direction towards the surge threshold line.

2. The method according to claim 1, further comprising:
    defining a deactivation threshold line in a turbocharger compressor map as a function of a turbocharger compressor pressure ratio and of a mass flow rate, wherein the deactivation threshold line is defined in terms of greater mass flow values for each corresponding pressure ratio value of the pre-surge threshold line; and
    deactivating, using the electronic control unit, the electric compressor when the turbocharger compressor working point crosses the deactivation threshold line in a direction away from the pre-surge threshold line.

3. The method according to claim 1, comprising:
    measuring, using the pressure sensor, a pressure value at the outlet of the turbocharger compressor;
    calculating a pressure value at the inlet of the turbocharger compressor using the measured pressure value at the outlet of the turbocharger compressor and a measured ambient pressure;
    calculating a turbocharger compressor pressure ratio between the pressure value at the outlet of the turbocharger compressor and the pressure value at the inlet of the turbocharger compressor.

4. The method according to claim 3, further comprising calculating the electric compressor pressure ratio by determining an electric compressor working point on an electric compressor map as a function of the measured rotational speed of the electric compressor and a mass flow rate of the electric compressor and calculating the pressure value at the inlet of the turbocharger compressor as a function of an electric compressor pressure ratio.

5. The method according to claim 1, further comprising calculating the mass flow rate of the turbocharger compressor as a function of an intake duct mass flow rate, a turbocharger compressor inlet pressure and a turbocharger compressor inlet temperature.

6. The method according to claim 5, further comprising:
measuring, using a rotational speed sensor, a rotational speed of the turbocharger;
calculating, using the electronic control unit, the mass flow rate of the turbocharger compressor;
determining, using the electronic control unit, the position of the turbocharger compressor working point on the turbocharger compressor map as a function of the measured rotational speed of the turbocharger and of the calculated mass flow rate of the turbocharger compressor.

7. The method according to claim 1, further comprising calculating the pressure value at the outlet of the turbocharger compressor as a function of an intake manifold measured pressure.

8. The method according to claim 1, further comprising determining the turbocharger compressor inlet temperature based on a measured ambient temperature.

9. A non-transitory computer readable medium comprising a computer-code which, when executed on a microprocessor, configures an automotive system having an internal combustion engine equipped with an electric compressor and a turbocharger including a turbocharger compressor to carry out following processes of
defining a surge threshold line and a pre-surge threshold line in a turbocharger compressor map as a function of a turbocharger compressor pressure ratio and a mass flow rate, wherein the pre-surge threshold line is defined in terms of greater mass flow values for each corresponding pressure ratio value of the surge threshold line;
monitoring, by using a mass airflow sensor and a pressure sensor, a position of a turbocharger compressor working point in the turbocharger compressor map as a function of the turbocharger compressor pressure ratio and the mass flow rate;
detecting, by using an electronic control unit, an increased torque request; and
activating, by using the electronic control unit, the electric compressor to assist the turbocharger compressor in delivering the requested torque when the turbocharger compressor working point crosses the pre-surge threshold line in a direction towards the surge threshold line.

10. An apparatus for operating an automotive system having an internal combustion engine equipped with an electric compressor and a turbocharger including a turbocharger compressor, the apparatus comprising:
a mass airflow sensor configured to sense a mass flow rate of the electric compressor;
a pressure sensor positioned at an outlet of the turbocharger compressor; and
an electronic control unit operably connected to the mass airflow sensor and the pressure sensor and configured to:
define a surge threshold line and a pre-surge threshold line in a turbocharger compressor map as a function of a turbocharger compressor pressure ratio and of a mass flow rate, wherein the pre-surge threshold line is defined in terms of greater mass flow values for each corresponding pressure ratio value of the surge threshold line;
monitor the position of a turbocharger compressor working point in the turbocharger compressor map as a function of the turbocharger compressor pressure ratio and of the mass flow rate;
detect an increased torque request; and
activate the electric compressor to assist the turbocharger compressor in delivering the requested torque when the turbocharger compressor working point crosses the pre-surge threshold line in a direction towards the surge threshold line.

11. The apparatus according to claim 10, wherein the electronic control unit is further configured to monitor the position of a turbocharger compressor working point in the turbocharger compressor map comprise a turbocharger rotational speed sensor.

* * * * *